Figure 4:
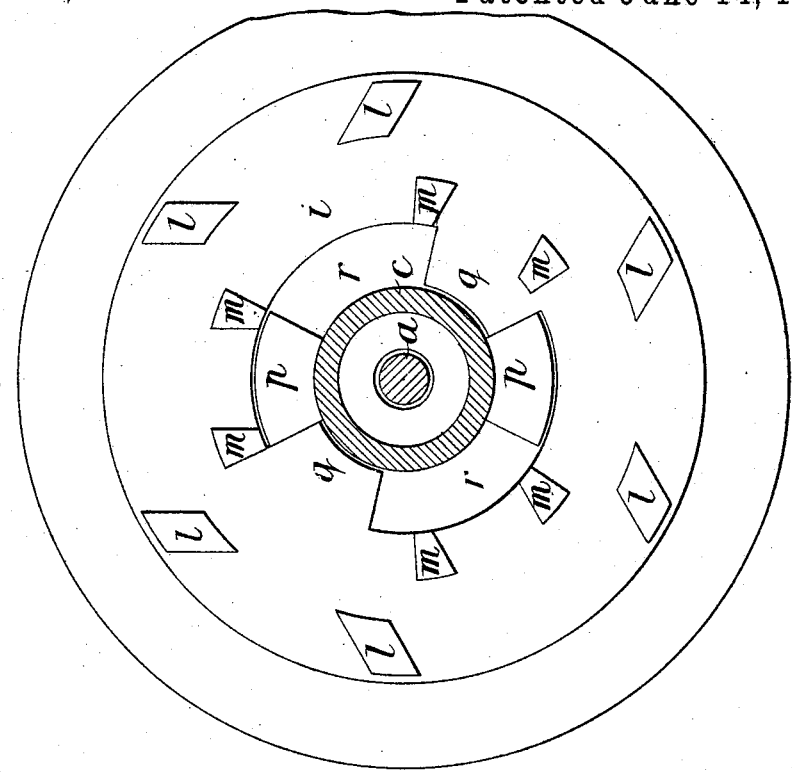

(No Model.) 3 Sheets—Sheet 1.
J. E. HUSSEY & A. I. SUMMERS.
BACK PEDALING BRAKE.
No. 605,718. Patented June 14, 1898.
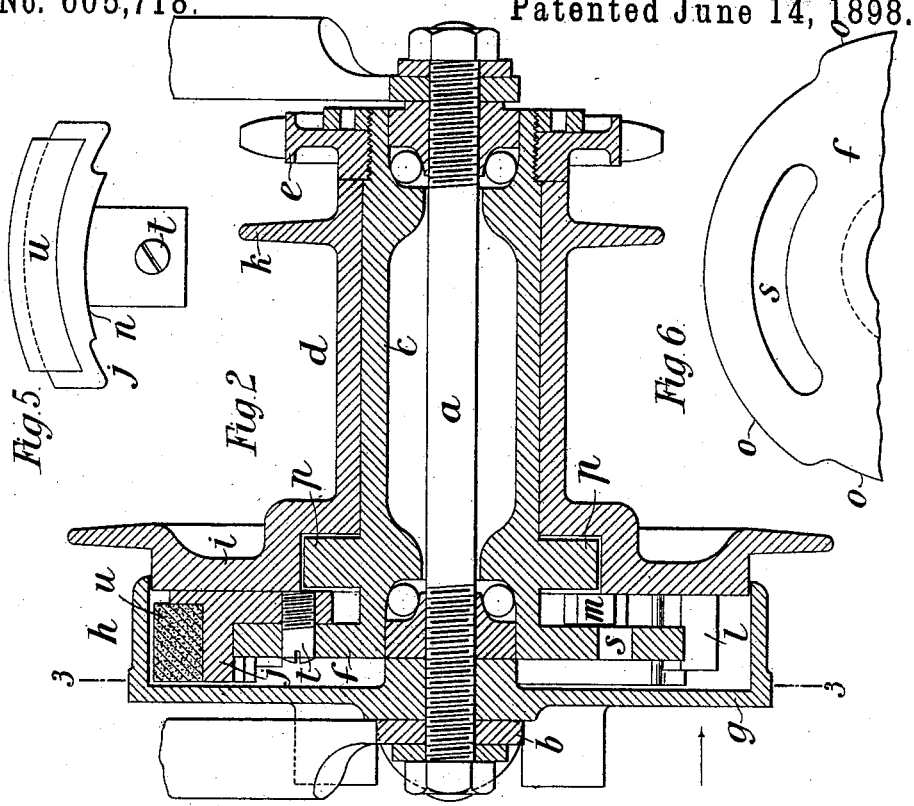
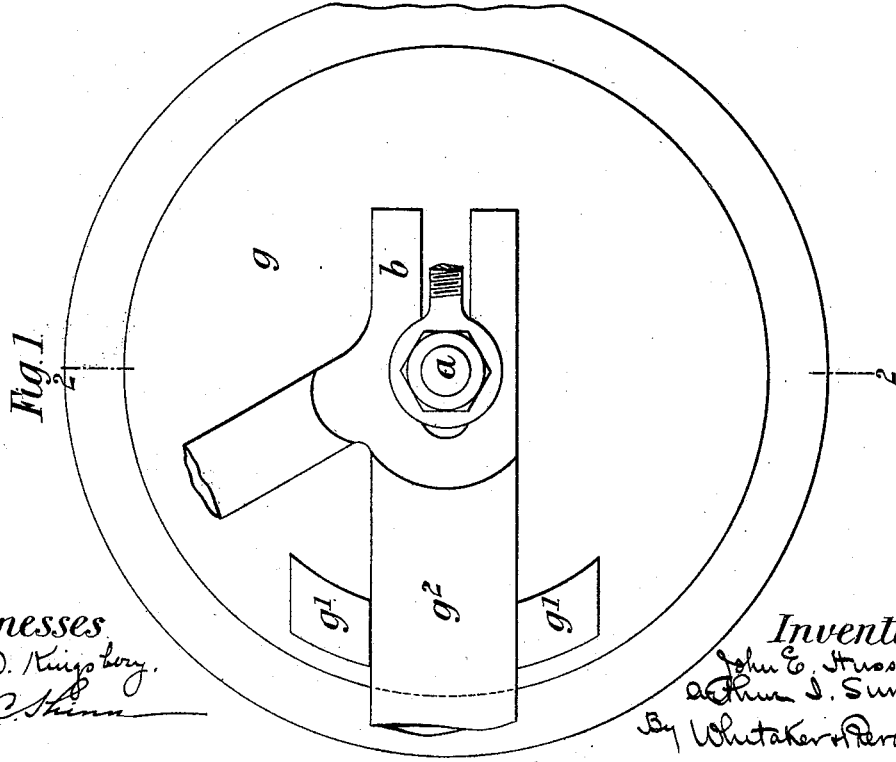
Witnesses
J. D. Kingsbury
G. C. Shinn
Inventors
John E. Hussey and
Arthur I. Summers
By Whitaker & Prevost attys (No Model.) 3 Sheets—Sheet 2.

J. E. HUSSEY & A. I. SUMMERS.
BACK PEDALING BRAKE.

No. 605,718. Patented June 14, 1898.

Witnesses
J. D. Kingsbury
J. C. Shinn

Inventors
John E. Hussey
Arthur I. Summers
By Whitaker & Prevost
Attys.

(No Model.) 3 Sheets—Sheet 3.
J. E. HUSSEY & A. I. SUMMERS.
BACK PEDALING BRAKE.
No. 605,718. Patented June 14, 1898.
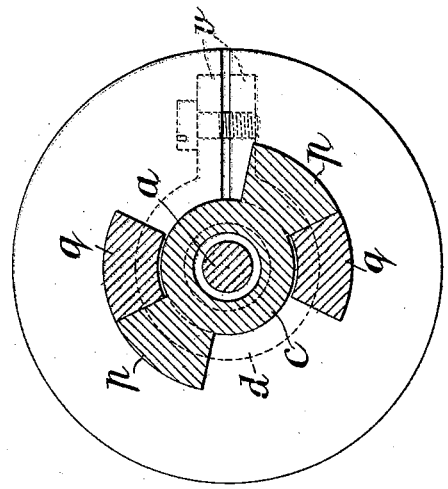
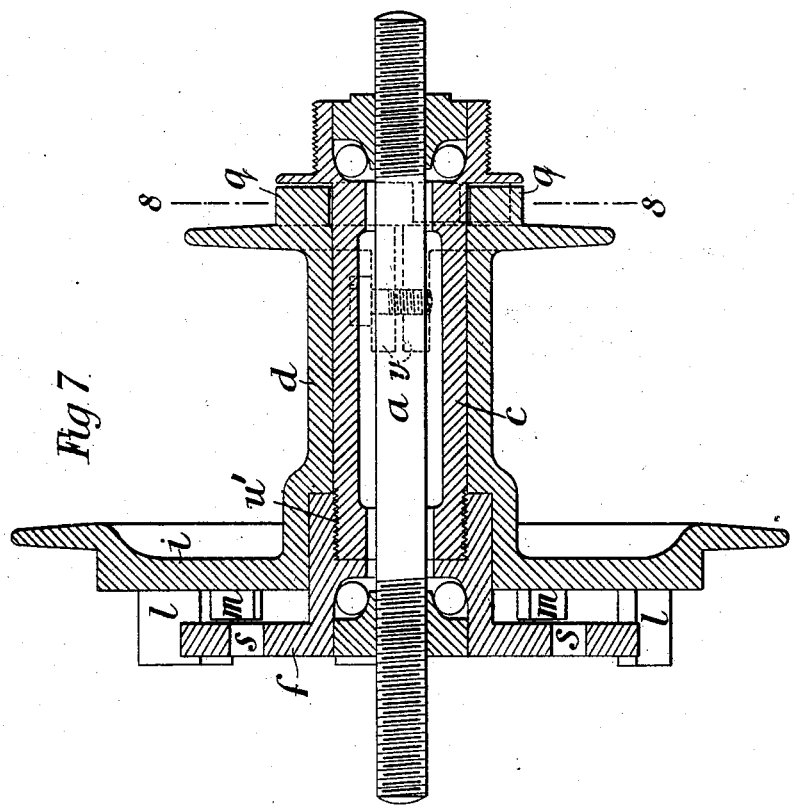
Witnesses
J. D. Kingsbury
G. C. Shinn
Inventors
John E. Hussey
Arthur I. Summers
By Whitaker & Prevost attys

UNITED STATES PATENT OFFICE.

JOHN EDWARD HUSSEY AND ARTHUR ISAAC SUMMERS, OF BRISTOL, ENGLAND.

BACK-PEDALING BRAKE.

SPECIFICATION forming part of Letters Patent No. 605,718, dated June 14, 1898.

Application filed August 21, 1897. Serial No. 649,029. (No model.)

*To all whom it may concern:*

Be it known that we, JOHN EDWARD HUSSEY and ARTHUR ISAAC SUMMERS, subjects of the Queen of Great Britain, residing at Bristol, England, have invented new and useful Improvements in Brake Mechanism for Use on Cycles, Horseless Carriages, and other Vehicles, of which the following is a specification.

Our invention relates to brakes for cycles, autocars or horseless carriages, and other vehicles.

In constructing a brake according to our invention we fix adjacent to the driving-wheel a dished disk—that is to say, a disk having a flange projecting from one face—(the said dished disk being hereinafter referred to as the "fixed" disk) and on the wheel we arrange a disk working inside the flange on the fixed disk and having in its periphery a sesies of brake-blocks designed to be pushed out in order to bring them in contact with the said flange to exact a braking action—for instance, by means of a cam arranged in conjunction with the said blocks and adapted to receive a slight rotation relatively with the disk in order to cause the projection of the said blocks. We also provide that when our improved brake is applied to a bicycle the act of back-pedaling should apply the brake. For this purpose we construct the driving-wheel with a double hub—that is to say, with a hub composed of two tubes, one of which fits accurately within the other. The wheel proper is built up upon the outer tube, which is provided with suitable flanges and carries the disk hereinbefore described having the brake-blocks. The inner tube is capable of a slight rotation independently of the outer tube (lugs on one tube working in cavities in the other tube) and carries on one end the usual sprocket or chain wheel and on the other end the cam for projecting the brake-blocks. So long as the machine is running under normal conditions no relative movement will take place between the two tubes, so that the cam will not project the brake-blocks. When, however, owing to back-pedaling the retardation of the inner tube takes place, the outer tube with the wheel, owing to the momentum, moves relatively with the inner tube sufficiently to cause the cam to project the brake-blocks into contact with the flange of the fixed disk.

To enable our invention to be fully understood, we will describe the same by reference to the accompanying drawings, in which—

Figure 3:
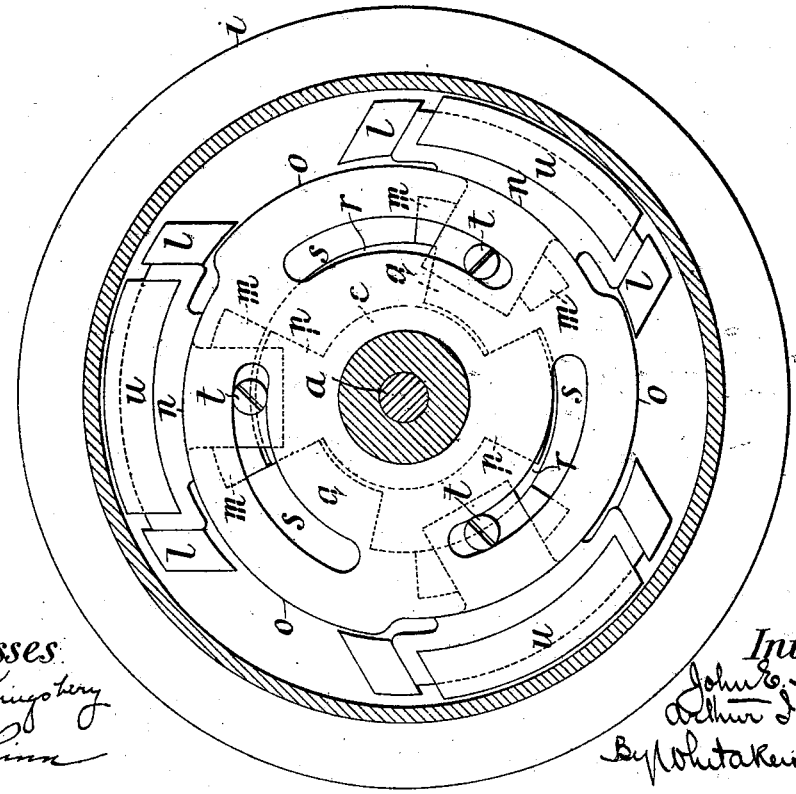

Figure 1 is a side elevation showing the arrangement of our brake in connection with the fork ends of a bicycle; and Fig. 2 is a section through the brake and the wheel-hub and axle on the line 2 2, Fig. 1. Fig. 3 is a section on the line 3 3, Fig. 2, looking in the direction of the arrow. Fig. 4 is a face view of the disk upon which the brake-blocks work. Fig. 5 is an elevation of one of the said brake-blocks, and Fig. 6 is an elevation of a portion of the cam for operating the said blocks. Fig. 7 is a sectional view illustrating a modification; and Fig. 8 is a section on the line 8 8, Fig. 7.

Similar letters of reference indicate corresponding parts in the several figures.

$a$ is the fixed axle secured in the fork ends $b\,b$, and $c\,d$ are the two tubes of the wheel-hub, the former of which runs on ball-bearings on the axle $a$, while the latter is fitted onto the exterior of the tube $c$ and is capable of a slight rotation relatively therewith.

$e$ is the chain-wheel, which is fixed upon one end of the inner tube $c$, and $f$ is the cam, which, as shown, is formed upon the other end of the said tube.

$g$ is the fixed disk, having a flange $h$ and provided with lugs $g'\,g'$, which embrace one of the bottom stays $g^2$, so as to render the disk immovable.

$i$ is the disk, having a series of brake-blocks $j$ sliding upon it. As shown, the disk $i$ is arranged to serve as one of the spoke-flanges of the wheel, the letter $k$ indicating the other spoke-flange.

The brake-blocks $j$, one of which is shown detached in Fig. 5, are each adapted to move between two pairs of guide-lugs $l\,l\,m\,m$, formed upon the face of the disk $i$, and each of the said blocks is formed with a surface $n$, against which a cam-surface $o$ on the cam $f$ will bear in a manner clearly illustrated in Figs. 2 and 3.

The cam $f$ has as many cam-surfaces $o$ as there are brake-blocks, and each of these surfaces is eccentric to the axis of the cam to such an extent that when one end of each cam is beneath its brake-block the latter will be out of contact with the flange $h$ of the fixed disk $g$, while when the other end is more or less beneath the block the latter will be pressed against the flange $h$ with more or less pressure.

The motion of the inner tube $c$, derived from the driving-chain on the sprocket-wheel $e$, is communicated to the outer tube $d$ and the wheel through the medium of two lugs $p$ $p$ on the tube $c$ bearing against other lugs $q$ $q$ in the disk $i$, the recesses or cavities $r$ $r$ between the lugs $q$ $q$ permitting of the independent motion of the disk $i$ relatively with the said lugs $p$ $p$.

With the arrangement hereinbefore described it will be understood that when the chain-wheel $e$ is being driven the lugs $p$ will be in contact with the lugs $q$ $q$ and cause the rotation of the wheel. When, however, owing to back-pedaling by the rider the rotation of the chain-wheel $e$ with the tube $c$ is more or less retarded, the momentum of the machine will cause the driving-wheel with the disk $i$ to move so that the said disk moves forward relatively with the tube $c$, and thereby brings the brake-blocks more or less into contact with the high portions of the cam-surfaces $o$, whereby the said brake-blocks are pressed into contact with the flange $h$, so retarding the motion of the machine. Immediately the rider again commences to drive the tube $c$ is rotated independently of the wheel until the lugs $p$ again come into contact with the lugs $q$ $q$, the cam $f$ being at the same time moved to allow of the brake-blocks being drawn away from the flange $h$. This latter movement of the brake-blocks is effected by cam-slots $s$ $s$, having the same amount of eccentricity relatively with the axis of the cam as the adjacent surfaces $o$ $o$. These slots $s$ $s$ act upon pins $t$ $t$, fixed to the brake-blocks, and serve to positively draw the brake-blocks back away from the flange $h$ when the driving recommences. The said grooves and pins also serve for preventing the blocks from moving into contact with the flange $h$ under centrifugal action during the running of the machine.

The brake-blocks $n$ $n$ are provided with removable friction-surfaces $u$, made of leather or other suitable material, so that when they are worn they may be replaced.

The construction shown in Figs. 1 to 6 and in which the cam $f$ is formed integral with the inner tube $c$ necessitates, in assembling the parts, passing the screw-threaded end of tube $c$ through the tube $d$, and as this screw-threaded end $c$ must be of considerable diameter in order to afford a firm connection between the sprocket-wheel $e$ and the said tube it follows that the tube $d$ must also be of considerable diameter. In order to reduce this diameter, we advantageously adopt the construction shown in Figs. 7 and 8. In these figures the cam $f$ is represented as being attached to the tube $c$ by means of screw-threads, as shown at $u'$, the said tube $c$ being made of considerably smaller diameter than the screw-threaded end of the said tube upon which the sprocket-wheel $e$ is mounted, the outer tube $d$ being of smaller diameter to receive and fit the tube $c$. Also with this arrangement the lugs $p$ and $q$ instead of being arranged adjacent to the disk $i$ are arranged between one end of the tube $d$ and the sprocket-wheel $e$, so as to still further lighten the appearance of the parts.

In order that the brake may not be applied too readily, owing to the retardation of the tube $d$ relatively with the tube $c$, we provide for clamping the tube $d$ more or less upon the said tube $c$, so as to prevent the too free movement of the latter relatively with the former. For instance, the tube $d$ may have a slot or saw-cut formed in it with lugs on each side of it, as indicated at $v$ $v$, Fig. 8, so that by tightening a screw passing through the said lugs the desired gripping action will be obtained.

Having now particularly described and ascertained the nature of our said invention and in what manner the same is to be performed, we declare that what we claim is—

1. A brake mechanism comprising among its members, a fixed disk provided with a friction-flange, a wheel-hub, a disk secured to said hub and provided with movable brake-blocks, a cam provided with grades for forcing said blocks into engagement with said flange and with cam-slots engaging studs on said blocks for positively withdrawing the same, a sleeve within said hub, having a limited rotary movement with respect thereto, a driving device on said sleeve, and connections between said sleeve and said cam, substantially as described.

2. A brake mechanism comprising among its members, a fixed disk provided with a friction-flange, a wheel-hub, a disk connected with said hub provided with a series of guides, radially-movable brake-blocks engaging said guides and provided with studs, a cam-disk having cam-slots engaging said studs and cam-grades for engaging said blocks to force them against the friction-flange, a sleeve extending through said hub, limited rotary movement in respect thereto, a driving device on said sleeve, said sleeve being secured to said cam-disk, substantially as described.

JOHN EDWARD HUSSEY.
ARTHUR ISAAC SUMMERS.

Witnesses:
HENRY VAN BODICOATE,
CHAS. W. TURNER.